Nov. 4, 1958  R. H. PARVIN ET AL  2,858,622
DEMONSTRATOR OF NAVIGATIONAL FLIGHT
AND LANDING PROCEDURES
Filed July 20, 1953  4 Sheets-Sheet 1

INVENTOR
RICHARD H. PARVIN
CHARLES L. COHEN
BY
ATTORNEY

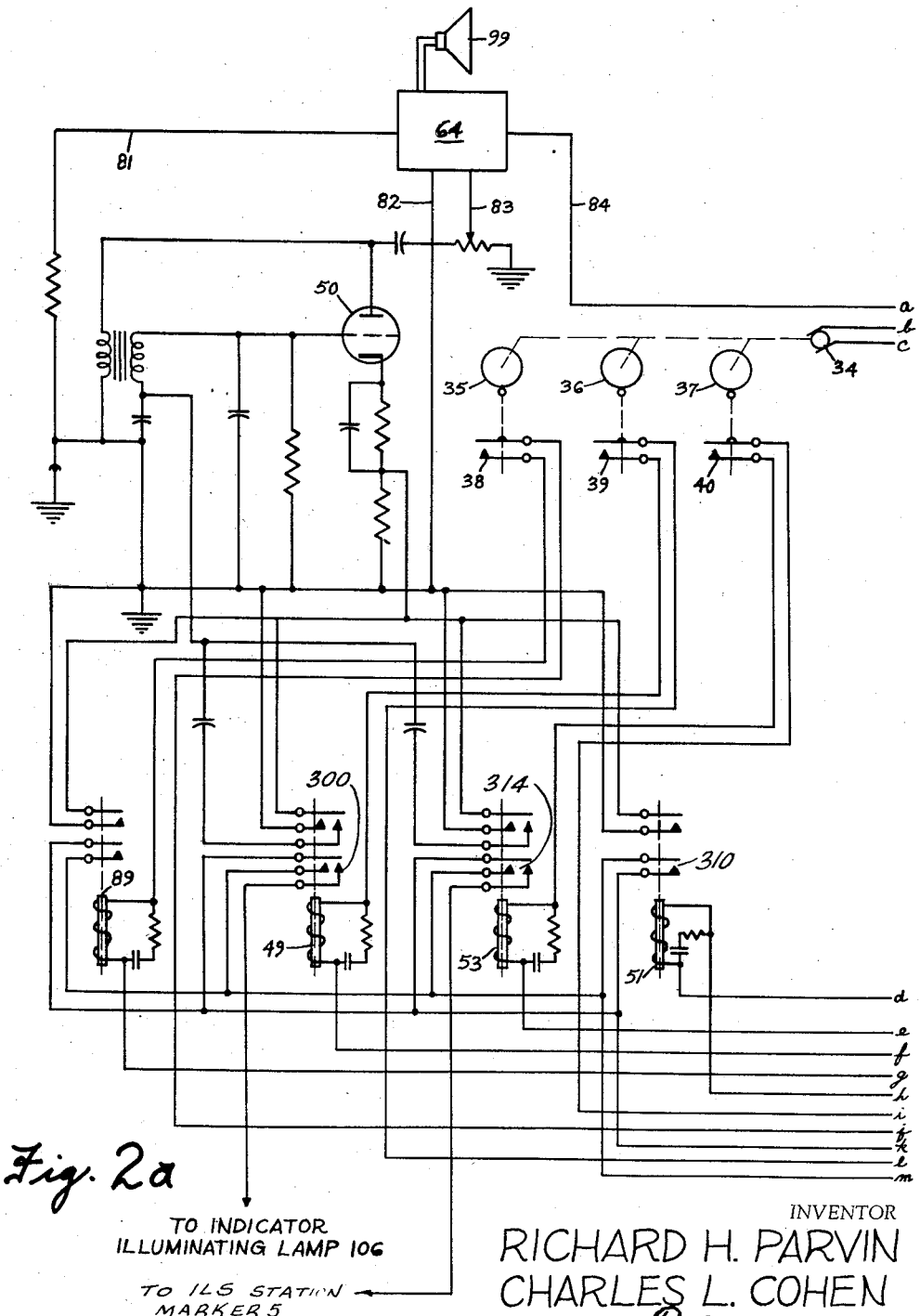

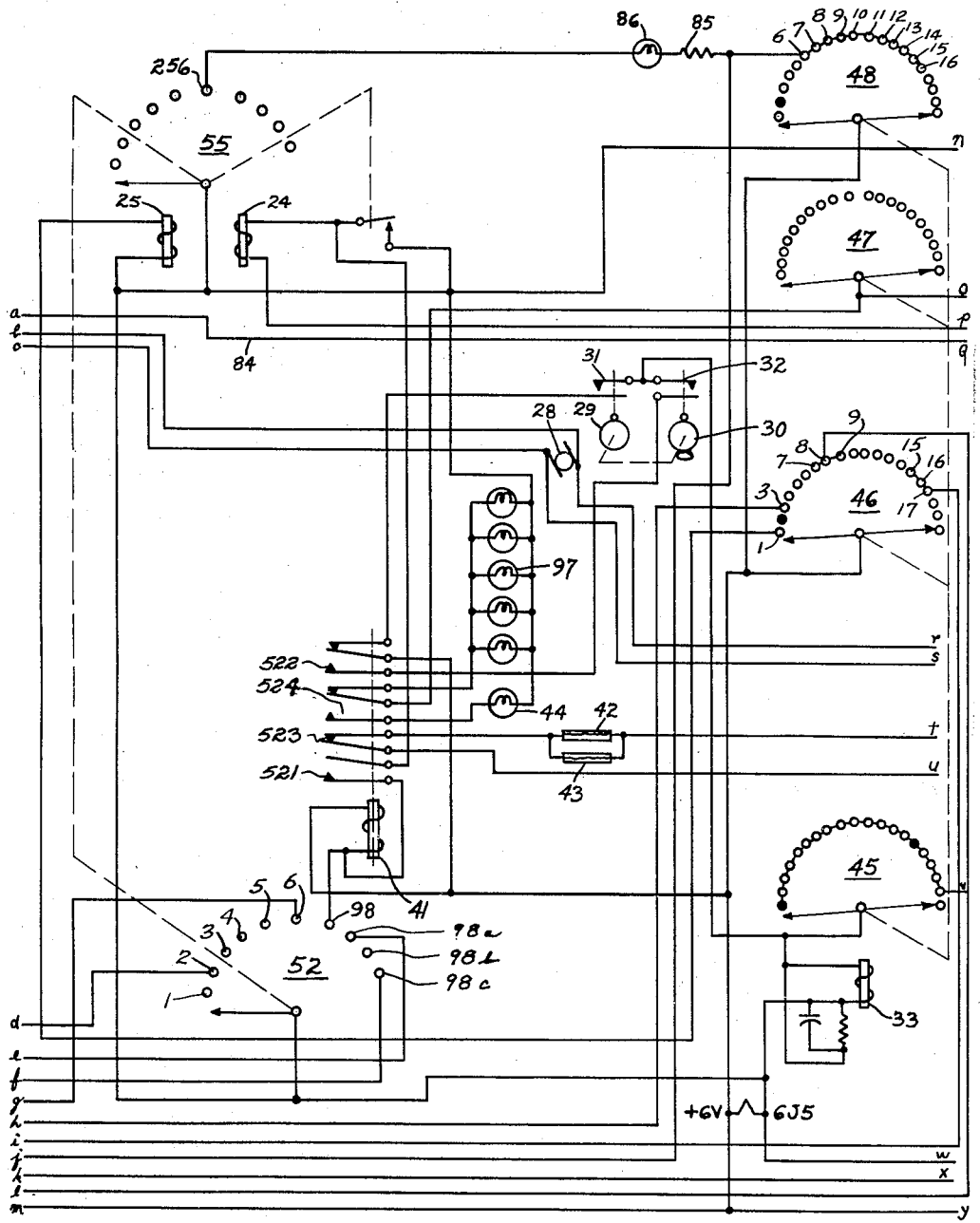

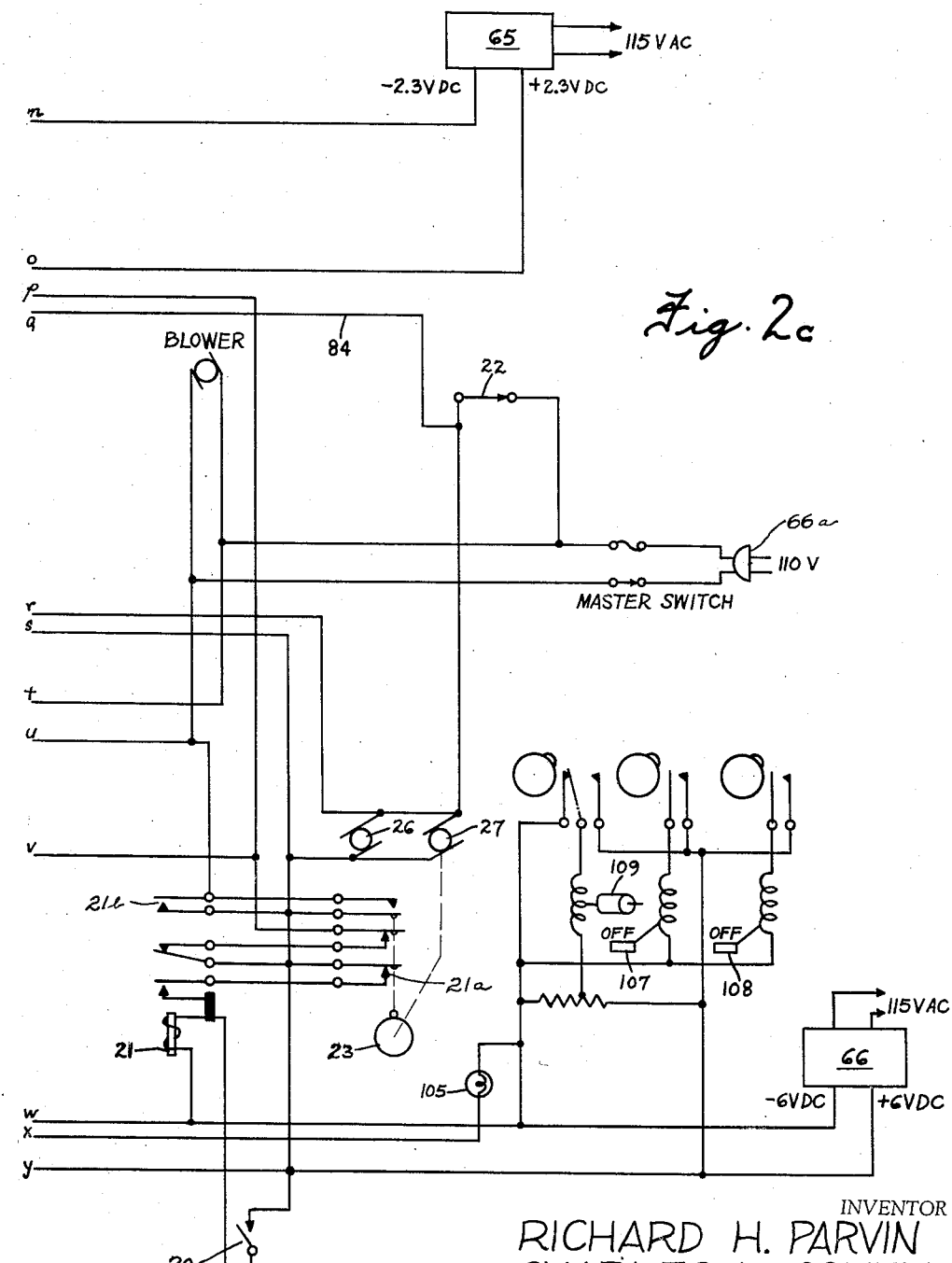

United States Patent Office 2,858,622
Patented Nov. 4, 1958

2,858,622

DEMONSTRATOR OF NAVIGATIONAL FLIGHT AND LANDING PROCEDURES

Richard H. Parvin, Silver Spring, and Charles L. Cohen, Radiant Valley, Md., assignors, by mesne assignments, to the United States of America as represented by the Secretary of the Navy Application July 20, 1953, Serial No. 368,889

1 Claim. (Cl. 35—10.2)

This invention relates to training devices that acquaint flight personnel with the operational use of the Instrument Landing System, Automatic Direction Finding, Visual Omni-range, Ground Controlled Approach, and Airways Communications systems.

This invention demonstrates, by visual and audible means, the instrument flight and instrument landing of an aircraft. The invention simulates the navigational flight and landing procedures of an airplane under typical flying conditions. A tape recorder incorporated within the device simulates airways communications between the pilot and ground stations.

Two instruments, a Radio Magnetic Indicator and an Omni-Bearing Indicator are visible to the observer or trainee. The two indicators are mechanically connected to and oriented by small electric motors to indicate readings in accordance with the visual and audible demonstration.

A generalized Aeronautical Sectional chart is utilized to trace the flight path of the airplane and indicate the location of radio stations by means of stationary lights and the location of the outer and middle marker beacons by means of two transparent cones. The actual "flight path" is represented by a strip or ribbon of plastic wherein the progress of the airplane is indicated by progressive light spots that appear on the flight path ribbon. The demonstration is completed when the plane lands on the runway.

It is a general object of this invention to provide a device that will illustrate ILS (Instrument Landing System), ADF (Automatic Direction Finding), VOR (Visual Omni-range), GCA (Ground Controlled Approach) and airways communications.

Another object is to provide a unit that is effective and simple.

An additional object is to simplify the method of alternately illuminating the numerous lamps that are utilized to indicate the position of the plane.

Figure 1:
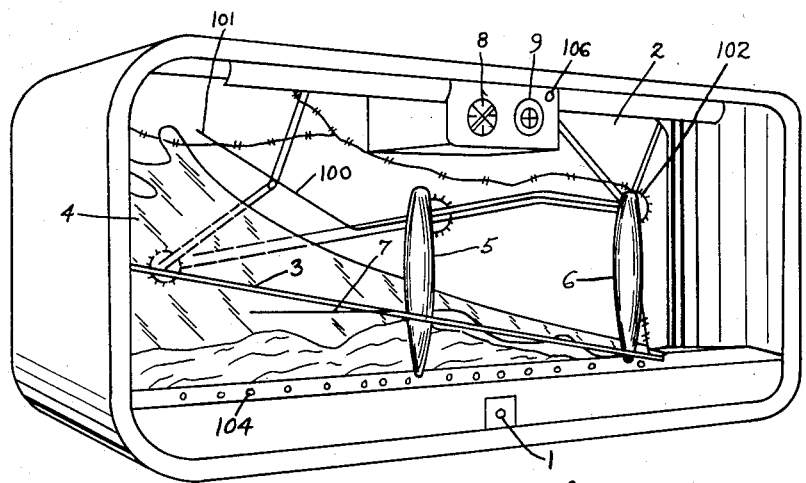
Figure 3:
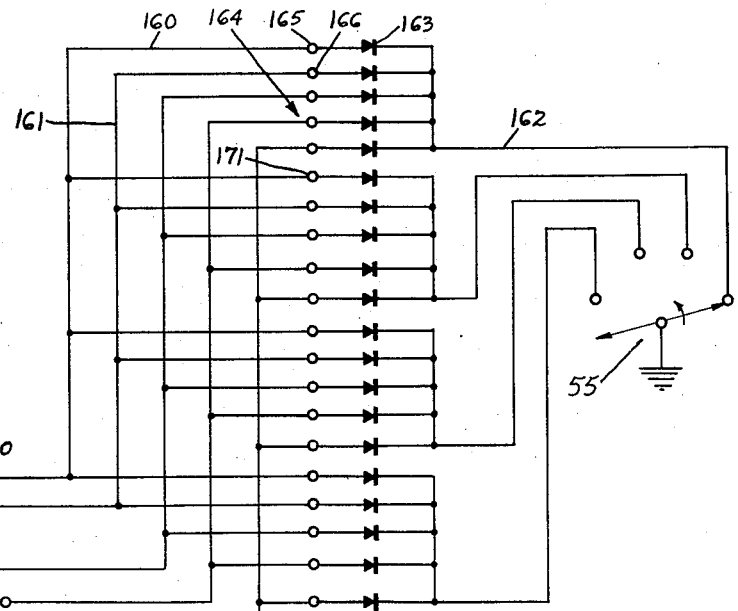

Other objects and many of the attendant advantages of this invention will be readily appreciated as the same becomes better understood by reference to the following detailed description when considered in connection with the accompanying drawings wherein:

Fig. 1 is a front view of the invention showing the aeronautical sectional chart, localizer radio transmission, glide path radio transmission, outer marker beacon, middle marker beacon and the flight path, Figs. 2a, 2b, and 2c combine by means of interconnecting points a—y to present a block and schematic of the present invention, and Fig. 3 is a schematic of the wiring of the progressively illuminated lamps.

Referring to Fig. 1, the operation of the present device is initiated by depressing the start button 1. The simulated aircraft travels across the aeronautical sectional chart 2 along a predetermined flight path 100. A plurality of bulbs (not shown) are sequentially operated to trace the path of travel of the airplane. At any specific instant only one bulb is operating. The airplane is "picked-up" at some convenient location 101 and then tracked until a landing is made at the airport located at 102.

The last few miles of flight is illustrated by a three dimensional model of plastic located immediately in front of the aeronautical sectional chart 2. The three dimensional model consists of a plastic facsimile of the outer marker beacon 5, a plastic facsimile of the middle marker beacon 6, a transparent sheet of plastic that represents the glide path radio transmission plane 4, a transparent sheet of plastic that represents the localizer radio transmission plane 3, a ribbon of plastic that represents the actual flight path 7 of an aircraft and a plurality of bulbs 104 that progressively illuminates said ribbon to indicate the instantaneous position of the airplane along the plastic flight path.

As each successive bulb 104 lights, the preceding bulb is extinguished. Therefore at any specific instant only one bulb is illuminated.

At the instant the airplane is "picked up," its position is noted on the aeronautical sectional chart 2 by a single spot of light. When the airplane is at a predetermined distance from the airport 102, the demonstration transfers from the aeronautical sectional chart 2 to the three dimensional plastic unit located immediately in front of the chart 2.

The flight path of the airplane along the glide slope is represented by a plastic ribbon 7. The location of the airplane is represented by a light spot that appears on the plastic ribbon 7 and originates from the bulbs 104.

Two instruments, the Radio Magnetic Indicator 8 and the combined OMNI-Bearing and Course and Glide Path Indicator 9, are located conveniently near the uppermost portion of the unit and are visible to the observer. A plurality of lamps are progressively illuminated to simulate the position of the airplane.

Located within the body of the device is a magnetic tape recorder and reproducer. The tape contains the narrative description of the demonstration and typical voice communications between the pilot of the aircraft and the ground stations.

The station codes are generated as required and are as follows:

| Station | Pitch, cycles | Code |
| --- | --- | --- |
| Z Marker | 3,000 | Continuous. |
| No. 3 Fan Marker | 3,000 | 3 dashes. |
| ILS Outer Marker (4.5 miles) | 400 | Continuous dot-dash. |
| ILS Middle Marker (3,000 ft.) | 1,300 | 2 dashes per secon |

The audible information is on a continuous or endless belt type of magnetic tape synchronized to operate in conjunction with the visual portion of the device.

The narration explains the use and operation of the Radio Magnetic Indicator and the combined OMNI-Bearing and Course and Glide Path Indicator and the conversations between the pilot of the airplane and the ground station. Said narration is not herein reproduced as such information is known by those experienced in the art.

Referring to Figs. 2a, 2b and 2c, the operation of this invention is as follows: After power is applied through the master switch, the relay 21 is energized by depressing the start switch 20 by means of starter button 1; the relay 21 is self-holding. At the instant relay 21 is activated, A. C. power is applied to motors 26, 27, 28 and 34. Motor 27 drives a timing cam 23 at ⅛ R. P. M., said cam ending the operation 8 minutes later by opening the self-holding contacts of relay 21. At the end of the 8 minute cycle the device is set for subsequent operation by the reset relay 24. Relay 24 is energized throughout the ILS 3-dimensional demonstration by the circuit comprising components 24, 521, the wiper of deck 52, power supply 66, 522, 32 and the wiper of deck 45 and, when de-energized, steps the decks 52 and 55 to a new start position. Switch 22 which is normally in the closed position is in the power line to motors 26, 27, 28 and 34. When switch 22 is opened manually by an operator, operation and progression of the demonstrator are ceased.

In the present invention the four synchronous timing motors are electrically connected in parallel. The motors 26 and 27 (Fig. 2c) are also used as instrument motors to drive the simulated Radio Magnetic Indicator 8 and the OMNI-Bearing Indicator 9 (Fig. 1) by means of two cam shafts (not shown). Two flags 107 and 108 and the instrument orienting synchro 109 (which is the radial selector indicator) are electrically activated. The radial selector indicates the VOR radio course on indicator 9 during the demonstration. The third motor 28 rotates two cams 29 and 30. The cam 29 opens and closes switch 31. Cam 30 opens and closes switch 32. The cam 29 has a single detent and the cam 30 has two detents. The advancing cam motor rotates the cam 29 thus operating switch 31 which activates the coil of relay 33 through the contacts of relay 41. When the relay coil 33 is energized, the demonstration begins. This relay coil is energized once every three seconds by the cam 29 and once every one and one-half seconds by the cam 30 depending on whether the operation is in the VOR or ILS modes as determined by relay 41. The motor 34 is mechanically connected to the keying cams 35, 36 and 37. The cams 35, 36 and 37 control switches 38, 39 and 40, respectively. The last mentioned switches are for the simulation of the Fan Marker through the relay 89, Middle ILS Marker through the relay 49 and Outer ILS Marker through the relay 53 respectively. Deck 52's contacts 1, 3, 4, and 5 are left open; contact 2 is coupled to energize the relay 51; and the contact 6 is coupled to energize the relay 89. The rotating contact of deck 52 of relay 25 energizes the coil of the relay 41 when said rotating contact is at the contact or terminal 98. This causes the demonstration to change from the aeronautical sectional chart to the three dimensional plastic portion of the device. When the rotating contact of relay 25, deck 52 moves off contact 98 the relay 41 is energized, 110 volts A. C. are removed from the frosted lamps 42 and 43, 2.3 volts D. C. are removed from the parallel connected lamps 97 that light up the fan stations 102 on the sectional chart 2, and the relay 33 is advanced by switch 32. Relay 41 is energized by applying 6 volts from the power supply 66 across the coil of relay 41 and furnishing a current return path through the wiper of deck 52 when said wiper touches contact 98; relay 41 is maintained in an energized state by the operation of contacts 521. Thus, 110 volts are removed from the lamps 42 and 43 by the circuit breaking of contacts 523 which are directly in the lines supplying A. C. power from the source at 66A; 2.3 volts are removed from the lamps 97 and applied to lamp 44 by operational contacts 524 which are directly in the power line of source 65; operation of relay 33 is likewise switched from contacts 31 to contacts 32 by the operation of relay 41 contacts 522.

The switch 32 advances the relay 33 and the voltage is transferred from the lamps 97 to the lamp 44 that represents the radio station at the runway of the airport model.

The stepping relay 33 advances at a uniform rate in a clockwise direction and consists of 4 decks wherein each deck contains 20 contacts or terminals. Associated with each of the 4 decks, 45, 46, 47 and 48 of the relay 33 is a double-ended wiper that is mounted on the rotating shaft. The wipers can rotate in one direction only by conventional means such as a ratchet. The pair of wipers traverse 20 contacts each half-revolution. As one wiper leaves the twentieth or last contact, the other wiper approaches the first contact.

In the homing deck 45 of relay 33, the first 19 contacts are electrically interconnected and the last contact is left open. At the time when the cam 23 completes one revolution (8 minutes), deck 45 (homing) of relay 33 steps to the disconnected last position. Also, contacts 21a are broken by the operation of cam 23. This operation de-energizes the relay 21 breaking contact 21b. When contacts 21b opens, A. C. power is removed from the motors 26, 27, 28 and 29 causing all operations to cease.

In deck 46 of relay 33, the 7th, 8th and 9th contacts are connected to the cam switch 39 of the middle ILS marker 6. The closing of switch 39 energizes the coil of the relay 49 thus causing a lamp 106 on the indicator to flash in accordance with cam 36. The flow of current is from one potential terminal of the power supply 66 to the rotating contact of deck 46, relay 33, through contact 7, 8 or 9 of said deck, through switch 39, through relay 49, and through deck 52 of relay 25 to the other potential terminal of said power supply. The lower movable contact of relay 49 supplies a potential to the indicating lamp 106 by means of the contact 300. The relay 49 also keys the oscillator 50 in the tape recorder audio circuit for the generation of the 1300 cycle tone. The number 1 contact of the deck 46 is connected to and energizes the relay advance coil 25. The number 3 contact is connected to energize the coil of the slow release relay 51. The relay 51 is connected to and activates the simulated fan marker, the indicator red light 105, and a 3000 cycle tone signal through the contact 310. The deck 46 of the relay 33 in conjunction with the deck 52 of the relay 25 activates the relays 89, 49, 53, 51 and 41 in a discrete sequence. Referring to relay 25, in the deck 52 the first, third, fourth and fifth contacts are open. The second contact is connected to actuate the relay 51 and the sixth contact is connected to actuate the relay 89.

The 15th, 16th and 17th contacts of the deck 46 of the relay 33 are connected through the cam operated switch 40 to the relay coil 53. The contacts 314 of the relay 53 are connected to flash a light bulb that represents the outer ILS marker wherein the duration of illumination is determined by the cam 37. The contacts No. 6 through No. 16 of deck 48 of the relay 33 connect to a 30 ohm resistor 85.

A bulb 86 representing an adjoining fan marker is connected through the resistor 85 to the relay 33, deck 48, contacts 6 through 16, to the power supply and operates when the deck 55 wiper is on contact 256.

The deck 47 of the relay 33 and the deck 55 of the relay 25 cooperate with each other to determine the sequence of lamps 165 on Fig. 3 which are located along path 100 on chart 2 and beneath openings 104 on Fig. 1 that pass current. These lamps indicate the location of the airplane. The rotating contact of deck 47 selects the power lead and the rotating contact of deck 55 selects the return lead.

Referring to Fig. 3, the power lead selector deck 47 selects the first, second, third, fourth or fifth lamp in each of a series of four group of lamps 164. In its position as shown in Fig. 3 switch 47 is shown at the first contact, thus selecting a lead 160 that supplies power to the first lamp such as 165 and 171 of each group of lamps. The return lead 162 is selected by the wiper of deck 55 which rotates counter to the wiper of deck 47. When the lead 162 is selected, lamp 165 lights. The same return lead 162 is utilized for the first group of lamps. At the instant that the relay 33 is advanced or stepped one position, the power is transferred to the power lead 161 thus causing the second bulb 166 to light.

At each instant that the power lead selector switch 47 starts its cycle, the rotating contact of deck 46, through its first contact, energizes the relay coil 25 to advance the arm of said relay one position. This cycling continues until the last light of the last group of lights has been illuminated. Thus the wiper arm of deck 55 advances one position for each complete cycle of the wiper arm of deck 47. The flow of current is from the deck 47 to the deck 55.

A small rectifier 163 is connected in series with each lamp and is oriented to allow a free flow of current from the deck 47 to the deck 55 only. The rectifier functions as a one-way switch to allow current to flow in one direction only. The rectifier prevents spurious indications by restricting the flow of current to a single path, thus allowing only one bulb to light at any particular instant.

Upon close examination of Fig. 3 it will become obvious that each lamp group contains five bulbs. This was done for simplicity.

The decks 47 and 55 of the relays 33 and 25 respectively were designed to operate 200 bulbs. Thus there are 20 contacts on the deck 47 of the relay 33 and ten contacts on the deck 55 of the relay 25.

However, it will become obvious that a large number of bulbs may be arranged in various uniform groups. It is also obvious that the sequence of energized bulbs can be altered from consecutive illumination to non-consecutive illumination.

The above mentioned method of selective illumination of a plurality of bulbs is an improvement over the present day methods. In the old method the number of lamps contained in the sequence was limited by the physical size of the contact disc. One wire was required for each lamp plus a common wire thus making a large bundle of wires necessary in an installation that requires a large number of lamps. The rotating brush and commutator device, that is utilized to alternate the lamp that is illuminated, makes a gradual connection with each contact thus resulting in a fading and flickering lamp.

The present invention utilizes a positive snap-action stepping relay in place of a revolving brush and commutator thus eliminating fade and flicker and a rectifier series coupled to each lamp to prevent spurious results by functioning as a "gate." The number of wires is reduced to a maximum of thirty (in the case of two hundred bulbs) instead of the two hundred and one wires that would be required if the old method of wiring were used. A further advantage of the new method is the simplicity of maintenance. For example, if every twentieth light is non-operative the trouble is in the power lead circuit; if twenty bulbs in series are non-operative, it indicates trouble in the power return circuit; if only one bulb is non-operative, it indicates trouble in the bulb or rectifier.

After eight minutes the cam 23 completes one revolution. At this instant the first through the nineteenth contacts of deck 45 of the relay 33 are energized, thus stepping the relay 33 to final or twentieth contact position, which is disconnected. This final contact is open, thus stopping the relay 33. At this instant, the relay 33 is reset and ready for another demonstration.

Returning to Figs. 2a, 2b and 2c, block unit 64 contains an amplifier and magnetic tape pickup that is of conventional design and construction. The conductor 81 is connected to the B+ of the amplifier. The conductor 82 is connected to a ground terminal within the amplifier. The conductor 83 is connected to the grid of a vacuum tube and conductor 84 is connected to the motor of the tape recorder. Connected to unit 64 is a speaker 99. This speaker produces sounds from the oscillator 50 as well as the conversation recorded on the tape.

The units 65 and 66 are power supplies that supply plus and minus 2.3 volts and plus and minus 6 volts D. C. respectively. The power supplies are also of conventional design and construction and they are not described in detail.

Obviously many modifications and variations of the present invention are possible in the light of the above teachings. It is therefore to be understood that within the scope of the appended claim the invention may be practiced otherwise than as specifically described.

What is claimed is:

A device to demonstrate the flight of an aircraft comprising a substantially horizontal plastic sheet to represent the localizer radio transmission plane, a vertical plastic sheet that intersects the horizontal plane at right angles to represent the glide path radio transmission plane, a cone that passes through the intersection of the horizontal and vertical planes to represent the middle marker beacon, another cone that passes through the intersection of the horizontal and vertical planes to represent the outer marker beacon, a plastic ribbon to represent the flight path that approaches and intersects the intersection of the vertical and horizontal plane and a means to generate a moving spot of light on the plastic ribbon to represent the location of an airplane.

References Cited in the file of this patent

UNITED STATES PATENTS

| | | |
|---|---|---|
| 1,889,202 | Karnes | Nov. 29, 1932 |
| 2,085,884 | Wilkinson | July 6, 1937 |
| 2,166,194 | Roman et al. | July 18, 1939 |
| 2,171,561 | Hooven | Sept. 5, 1939 |
| 2,269,410 | New | Jan. 6, 1942 |
| 2,313,480 | Reid | Mar. 9, 1943 |
| 2,458,892 | Burdick | Jan. 11, 1949 |
| 2,481,247 | Schott | Sept. 6, 1949 |
| 2,486,502 | Spafford | Nov. 1, 1949 |
| 2,499,646 | Horn et al. | Mar. 7, 1950 |
| 2,511,996 | Robineau | June 20, 1950 |
| 2,528,394 | Sharpless et al. | Oct. 31, 1950 |
| 2,603,886 | Hodgson | July 22, 1952 |
| 2,620,981 | Benson et al. | Dec. 9, 1952 |
| 2,666,912 | Gow et al. | Jan. 19, 1954 |

OTHER REFERENCES

McCallum et al.: Mechanized Reasoning, Electronic Engineering, April 1951, page 128.